US012672136B2

(12) United States Patent
Lee et al.

(10) Patent No.: US 12,672,136 B2
(45) Date of Patent: Jun. 30, 2026

(54) METHOD AND APPARATUS FOR HARQ-ACK TRANSMISSION IN WIRELESS COMMUNICATION SYSTEM

(71) Applicant: LG ELECTRONICS INC., Seoul (KR)

(72) Inventors: Youngdae Lee, Seoul (KR); Suckchel Yang, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 350 days.

(21) Appl. No.: 18/137,050

(22) Filed: Apr. 20, 2023

(65) Prior Publication Data

US 2023/0345481 A1     Oct. 26, 2023

Related U.S. Application Data

(60) Provisional application No. 63/334,057, filed on Apr. 22, 2022.

(51) Int. Cl.
| | |
|---|---|
| *H04W 72/1273* | (2023.01) |
| *H04L 1/1812* | (2023.01) |
| *H04W 72/02* | (2009.01) |
| *H04W 72/21* | (2023.01) |
| *H04W 72/23* | (2023.01) |

(52) U.S. Cl.
CPC ....... *H04W 72/1273* (2013.01); *H04L 1/1812* (2013.01); *H04W 72/02* (2013.01); *H04W 72/21* (2023.01); *H04W 72/23* (2023.01)

(58) Field of Classification Search
CPC ... H04L 1/1671; H04L 1/1812; H04L 1/1854; H04L 1/1861; H04L 1/1896
See application file for complete search history.

(56) References Cited

U.S. PATENT DOCUMENTS

2022/0377771 A1* 11/2022 Park .................. H04W 72/0446
2023/0057047 A1*  2/2023 Hosseini ............... H04L 1/1812

OTHER PUBLICATIONS

Nokia , Remaining Issues on Reliability Improvements for RRC_CONNECTED UEs supporting MBS, 3GPP Draft; R1-2201007, Feb. 11, 2022 (Year: 2022).*
TS38.1213, 3rd Generation Partnership Project; Technical Specification Group Radio Access Network; NR; Physical layer procedures for control (Release 17), Mar. 2022. V17.1.0, Year 2022. (Year: 2022).*

* cited by examiner

*Primary Examiner* — Zhensheng Zhang
(74) *Attorney, Agent, or Firm* — BRYAN CAVE LEIGHTON PAISNER LLP

(57)     ABSTRACT

A method and an apparatus for transmitting or receiving hybrid automatic repeat request (HARQ)-acknowledgement (ACK) information in a wireless communication system are disclosed. A method according to an embodiment of the present disclosure includes receiving a plurality of physical downlink shared channels (PDSCH) related to a specific HARQ-ACK reporting mode; and transmitting at least one of hybrid automatic repeat request (HARQ)-acknowledgement (ACK) information for the plurality of PDSCHs or other uplink transmission, and based on one selected PUCCH resource and the other uplink transmission being overlapped, HARQ-ACK information for the plurality of PDSCHs may be determined based on the specific HARQ-ACK reporting mode being transformed into other HARQ-ACK reporting mode.

15 Claims, 11 Drawing Sheets

FIG.6

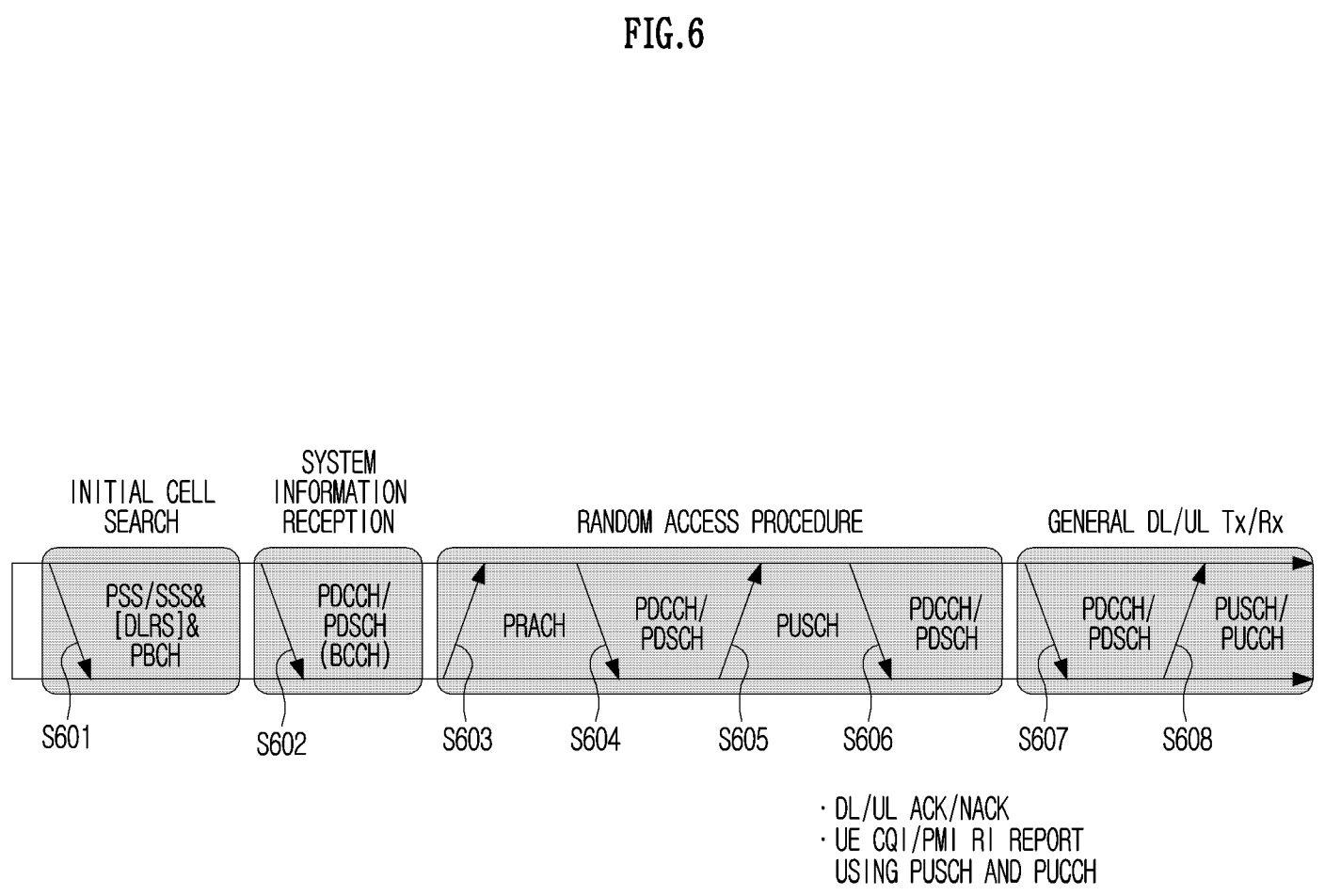

INITIAL CELL SEARCH

PSS/SSS&[DLRS]&PBCH — S601

SYSTEM INFORMATION RECEPTION

PDCCH/PDSCH (BCCH) — S602

RANDOM ACCESS PROCEDURE

PRACH — S603

PDCCH/PDSCH — S604

PUSCH — S605

PDCCH/PDSCH — S606

GENERAL DL/UL Tx/Rx

PDCCH/PDSCH — S607

PUSCH/PUCCH — S608

· DL/UL ACK/NACK
· UE CQI/PMI RI REPORT USING PUSCH AND PUCCH

FIG.7

| PUCCH for SR | PUCCH for PDSCH #3 | PUCCH for PDSCH #2 |

| Multicast PDSCH #3 |

| Unicast PDSCH #1 | Multicast PDSCH #2 |

| PUCCH for PDSCH #1 |

Configured to select one PUCCH resource
corresponding to a combination of values of
a plurality of HARQ-ACK information bits
among a plurality of PUCCH resource sets.      S810

Receiving a plurality of PDSCHs related to
a specific HARQ-ACK reporting mode      S820

Transmitting at least one of
HARQ-ACK information for a plurality of PDSCHs, or
other uplink transmission      S830

METHOD AND APPARATUS FOR HARQ-ACK TRANSMISSION IN WIRELESS COMMUNICATION SYSTEM

CROSS-REFERENCE RELATED APPLICATIONS

This application claims the benefit of earlier filing date and right of priority to U.S. Provisional Application No. 63/334,057, filed on Apr. 22, 2022, the contents of which are all hereby incorporated by reference herein in their entirety.

TECHNICAL FIELD

The present disclosure relates to a wireless communication system, and more particularly, to a method and apparatus for transmitting or receiving hybrid automatic repeat request-acknowledgement (HARQ-ACK) information in a wireless communication system.

BACKGROUND

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

SUMMARY

A technical object of the present disclosure is to provide a method and an apparatus for multiplexing and transmitting or receiving HARQ-ACK information of various reporting modes in a wireless communication system.

An additional technical problem of the present disclosure is to provide a method and an apparatus for multiplexing and transmitting or receiving NACK only-based HARQ-ACK information and other uplink control information (UCI) in a wireless communication system.

The technical objects to be achieved by the present disclosure are not limited to the above-described technical objects, and other technical objects which are not described herein will be clearly understood by those skilled in the pertinent art from the following description.

A method performed by a terminal in a wireless communication system according to an aspect of the present disclosure includes receiving a plurality of physical downlink shared channels (PDSCH) related to a specific HARQ-ACK reporting mode; and transmitting at least one of hybrid automatic repeat request (HARQ)-acknowledgement (ACK) information for the plurality of PDSCHs or other uplink transmission, and in order to select one physical uplink control channel (PUCCH) resource corresponding to a combination of values of a plurality of HARQ-ACK information bits corresponding to the plurality of PDSCHs respectively among a plurality of PUCCH resource sets, a configuration is performed for the terminal and on a basis that the selected one PUCCH resource and the other uplink transmission are overlapped, HARQ-ACK information for the plurality of PDSCHs may be determined on a basis that the specific HARQ-ACK reporting mode is transformed into other HARQ-ACK reporting mode.

A method performed by a base station in a wireless communication system according to an additional aspect of the present disclosure includes transmitting a plurality of physical downlink shared channels (PDSCH) related to a specific HARQ-ACK reporting mode to at least one terminal; and receiving at least one of hybrid automatic repeat request (HARQ)-acknowledgement (ACK) information for the plurality of PDSCHs or other uplink transmission from one terminal of the at least one terminal, and in order to select one physical uplink control channel (PUCCH) resource corresponding to a combination of values of a plurality of HARQ-ACK information bits corresponding to the plurality of PDSCHs respectively among a plurality of PUCCH resource sets, a configuration is performed for the terminal and on a basis that the selected one PUCCH resource and the other uplink transmission are overlapped, HARQ-ACK information for the plurality of PDSCHs may be determined on a basis that the specific HARQ-ACK reporting mode is transformed into other HARQ-ACK reporting mode.

According to the present disclosure, a method and an apparatus for multiplexing and transmitting or receiving HARQ-ACK information of various reporting modes in a wireless communication system may be provided.

According to the present disclosure, a method and an apparatus for multiplexing and transmitting or receiving NACK only-based HARQ-ACK information and other uplink control information (UCI) in a wireless communication system.

Effects achievable by the present disclosure are not limited to the above-described effects, and other effects which are not described herein may be clearly understood by those skilled in the pertinent art from the following description.

BRIEF DESCRIPTION OF DRAWING

Accompanying drawings included as part of detailed description for understanding the present disclosure provide embodiments of the present disclosure and describe technical features of the present disclosure with detailed description.

FIG. 6 illustrates physical channels used in a wireless communication system to which the present disclosure may be applied and a general signal transmission and reception method using them.

FIG. 7 represents an example on a variety of HARQ-ACK and UCI transmissions to which the present disclosure may be applied.

DETAILED DESCRIPTION

Figure 1:
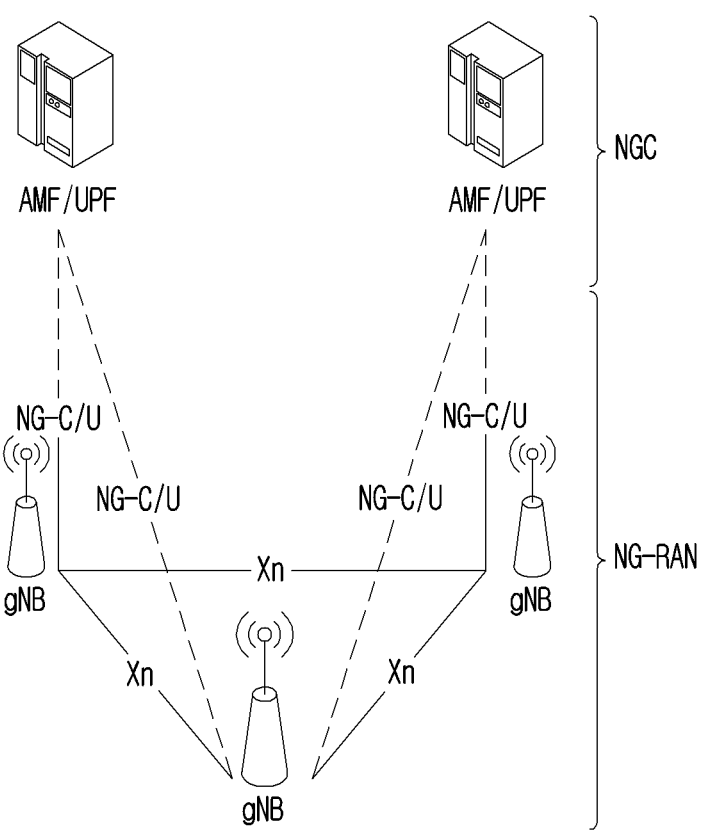
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power
Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC (Radio Link Control)/MAC/PHY) and UE. The gNBs are interconnected through a Xn interface. The gNB, in addition, is connected to an NGC (New Generation Core) through an NG interface. In more detail, the gNB is connected to an AMF (Access and Mobility Management Function) through an N2 interface, and is connected to a UPF (User Plane Function) through an N3 interface.

Figure 2:
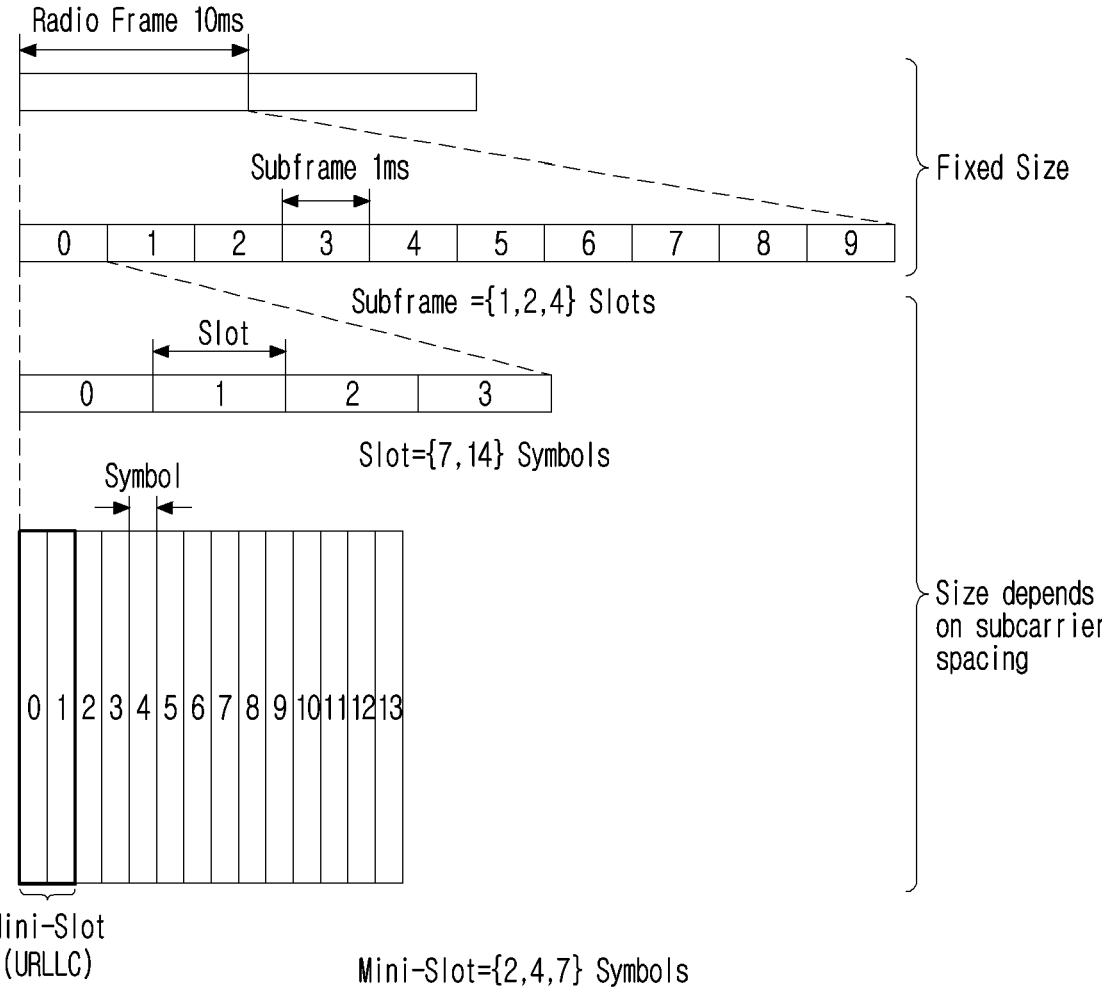
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is $480 \cdot 10^3$ Hz and $N_f$ is 4096. Downlink and uplink transmission is configured (organized) with a radio frame having a duration of $T_f=1/(\Delta f_{max} N_f/100) \cdot T_c=10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame,\mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing.

Figure 3:
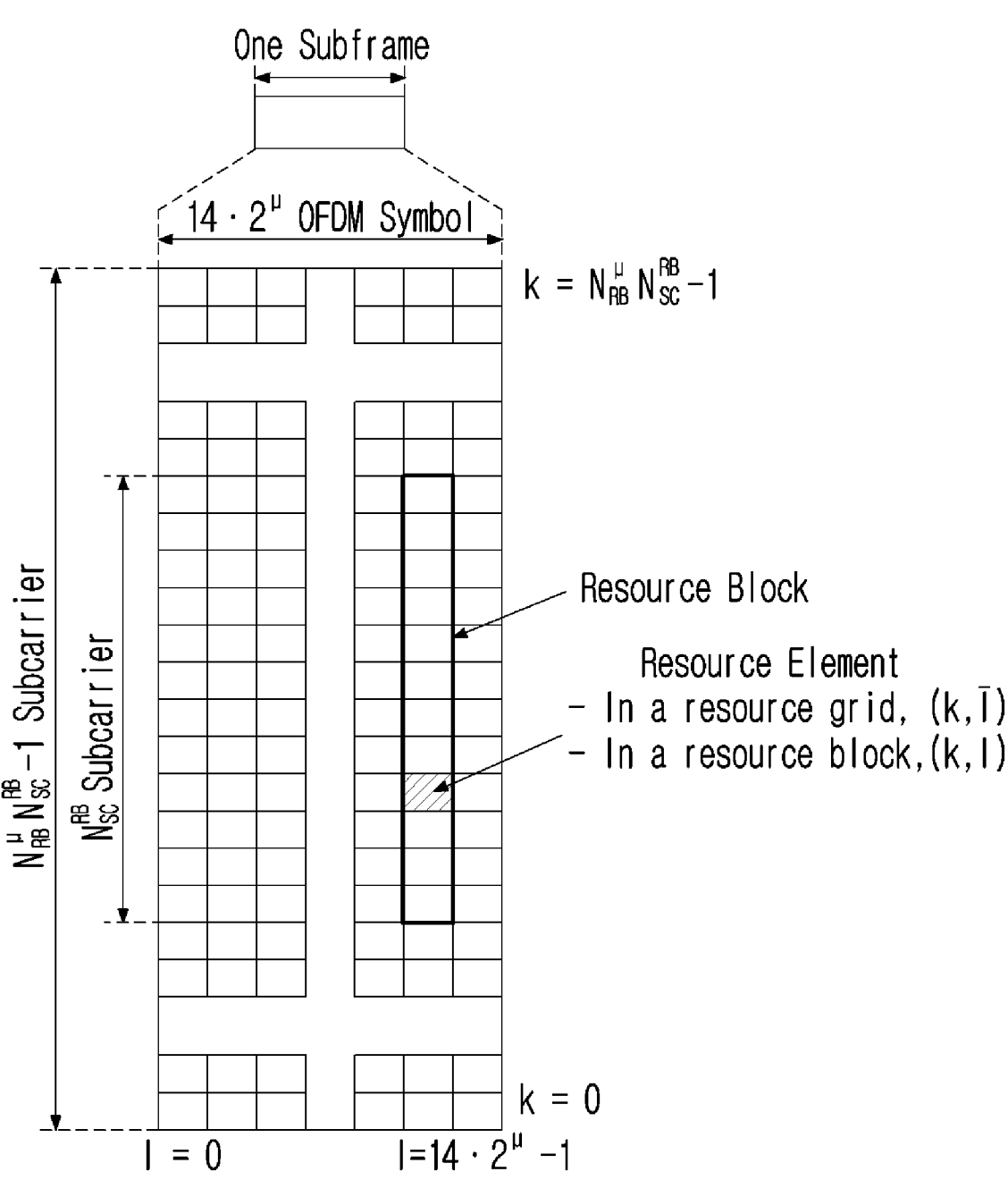
FIG. 3 illustrates a resource grid in a wireless communication system to which the present disclosure may be applied.

FIG. 3 illustrates a resource grid in a wireless communication system to which the present disclosure may be applied.

In reference to FIG. 3, it is illustratively described that a resource grid is configured with $N_{RB}^\mu N_{sc}^{RB}$ subcarriers in a frequency domain and one subframe is configured with $14 \cdot 2^\mu$ OFDM symbols, but it is not limited thereto. In an NR system, a transmitted signal is described by OFDM symbols of $2^\mu N_{symb}^{(\mu)}$ and one or more resource grids configured with $N_{RB}^\mu N_{sc}^{RB}$ subcarriers. Here, $N_{RB}^\mu \leq N_{RB}^{max,\mu}$. The $N_{RB}^{max,\mu}$ represents a maximum transmission bandwidth, which may be different between an uplink and a downlink as well as between numerologies. In this case, one resource grid may be configured per μ and antenna port p. Each element of a resource grid for μ and an antenna port p is referred to as a resource element and is uniquely identified by an index pair (k,l'). Here, $k=0, \ldots, N_{RB}^\mu N_{sc}^{RB}-1$ is an index in a frequency domain and $l'=0, \ldots, 2^\mu N_{symb}^{(\mu)}-1$ refers to a position of a symbol in a subframe. When referring to a resource element in a slot, an index pair (k,l) is used. Here, $l=0, \ldots, N_{symb}^\mu-1$. A resource element (k,l') for μ and an antenna port p corresponds to a complex value, $a_{k,l'}^{(p,\mu)}$. When there is no risk of confusion or when a specific antenna port or numerology is not specified, indexes p and μ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration μ. The center of subcarrier 0 of common resource block 0 for a subcarrier spacing configuration μ is identical to 'point A'. A relationship between a common resource block number $n_{CRB}^{\mu}$ and a resource element (k,l) for a subcarrier spacing configuration μ in a frequency domain is given as in the following Equation 1.

$$n_{CRB}^{\mu} = \left\lfloor \frac{k}{N_{sc}^{RB}} \right\rfloor \qquad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block $n_{PRB}$ and a common resource block $n_{CRB}$ in BWP i is given by the following Equation 2.

$$n_{CRB}^{\mu} = n_{PRB}^{\mu} + N_{BWP,i}^{start,\mu} \qquad \text{[Equation 2]}$$

$N_{BWP,i}^{start,\mu}$ is a common resource block that a BWP starts relatively to common resource block 0.

Figure 4:
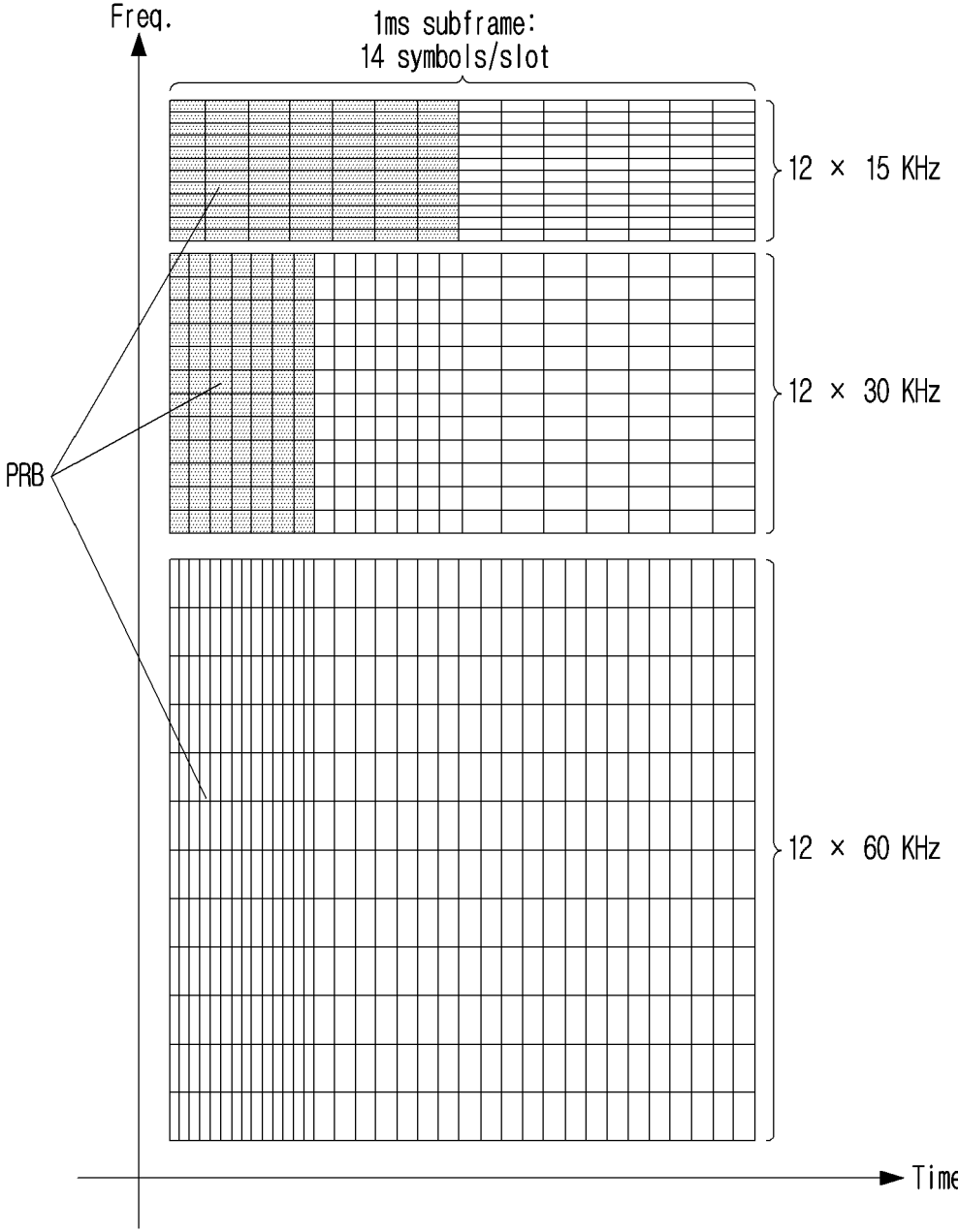
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
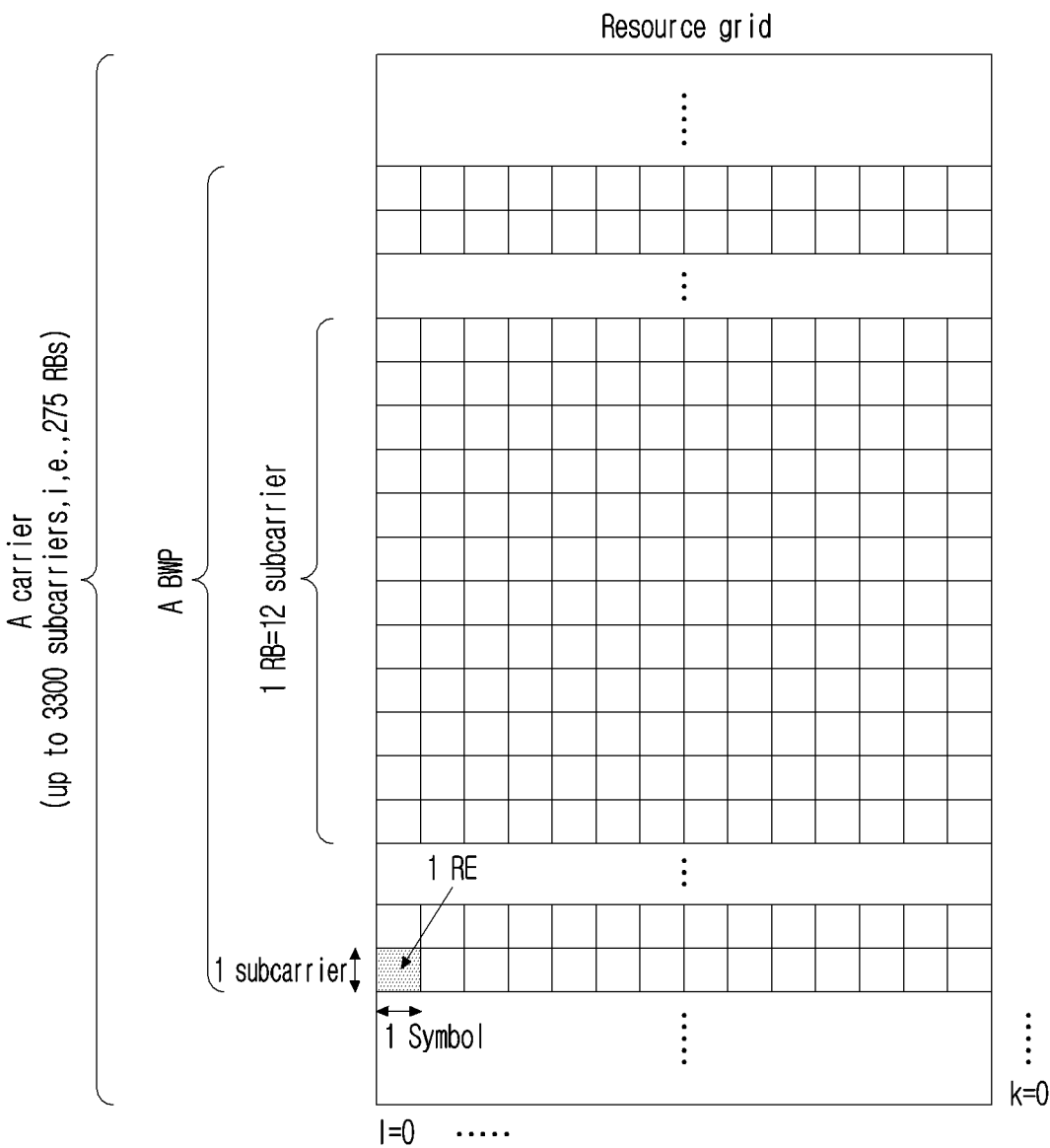
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station. Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602).

Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
|---|---|
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid—Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB) (e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

MBMS (Multimedia Broadcast Multicast Service)

MBMS may include a single frequency network (SFN) scheme in which a plurality of base stations or a plurality of cells are synchronized to transmit the same data to a terminal, and a single cell point to multipoint (SC-PTM) scheme for broadcasting within the corresponding cell coverage through the PDCCH/PDSCH channel.

SFN scheme may be used to provide a broadcast service to a wide area (e.g., MBMS area) through resources allocated semi-statically in advance. A multicast broadcast single frequency network (MBSFN) provides logical channels, a multicast control channel (MCCH) and a multicast traffic channel (MTCH), and both of the MCCH and the MTCH are mapped to a transport channel, a multicast channel (MCH), and the MCH is mapped to a physical channel, a physical multicast channel (PMCH). That is, a plurality of base stations/cells may be synchronized to provide the same data to a terminal through the PMCH. One base station/cell may belong to a plurality of MBSFN areas. In addition, it may be required to configure the MBSFN subframe for the MBSFN service.

SC-PTM scheme may be mainly used to provide a broadcast service only within a cell coverage through dynamic resources. SC-PTM provides one logical channel, SC-MCCH (Single Cell Multicast Control Channel) and one or more logical channels SC-MTCH (Single Cell Multicast Traffic Channel). These logical channels (i.e., SC-MCCH and SC-MTCH) are mapped to the transport channel, DL-SCH, and the transport channel DL-SCH is mapped to the physical channel PDSCH. A PDSCH transmitting data corresponding to the SC-MCCH or SC-MTCH is scheduled through a PDCCH that is CRC scrambled with a group-radio network temporary identifier (G-RNTI). Here, a temporary mobile group identity (TMGI) corresponding to the MBMS service ID may be mapped one-to-one with a specific G-RNTI value. Accordingly, if the base station provides a plurality of MBMS services, a plurality of G-RNTI values may be allocated for SC-PTM transmission. One or more terminals may perform PDCCH monitoring using a specific G-RNTI to receive a specific MBMS service. Here, a discontinuous reception (DRX) on-duration period dedicated to SC-PTM may be configured for a specific MBMS service/specific G-RNTI. In this case, the corresponding terminals may wake up only for a specific on-duration period and perform PDCCH monitoring for the G-RNTI.

SPS (Semi-Persistent Scheduling)

The base station may provide a specific terminal with SPS configuration dedicated to the terminal, and allocate one or more downlink SPS transmission resources that are repeated according to a configured period. DCI of terminal-dedicated (or terminal-specific) PDCCH may indicate activation (SPS activation) of a specific SPS configuration index. The terminal may perform downlink reception through the activated SPS transmission resource. Such SPS transmission resource may be used for initial HARQ transmission. The base station may allocate a retransmission resource of a specific SPS configuration index through DCI of PDCCH dedicated to a terminal. For example, when the terminal reports HARQ NACK for the SPS transmission resource, the base station may allocate the retransmission resource through DCI so that the terminal may receive downlink retransmission.

DCI of PDCCH dedicated to a terminal may indicate release or deactivation of a specific SPS configuration index. In this case, the corresponding terminal does not receive the SPS transmission resource for which release/deactivation is indicated.

CRC of DCI/PDCCH for activation/retransmission/deactivation for SPS configuration/resource may be scrambled by configured scheduling-radio network temporary identifier (CS-RNTI).

MBS (Multicast Broadcast Service)

In the NR-based wireless communication system, introduction of a new MBS-based DL broadcast or DL multicast transmission scheme, which is distinct from the aforementioned MBMS (e.g., MBSFN or SC-PTM), is being discussed. For example, the network side (e.g., base station/cell/TRP) may provide a point-to-multipoint (PTM) transmission scheme and a point-to-point (PTP) transmission scheme for DL broadcast or DL multicast transmission.

In the PTM transmission scheme for MBS, the base station may transmit a group common (or group-specific) PDCCH and a group common PDSCH to a plurality of terminals. A plurality of terminals may simultaneously receive the same group common PDCCH transmission and group common PDSCH transmission, and decode the same MBS data.

In the PTP transmission scheme for MBS, the base station may transmit a terminal-dedicated (or terminal-specific) PDCCH and a terminal-dedicated PDSCH to a specific terminal. The corresponding single terminal may receive the terminal-dedicated PDCCH and a terminal-dedicated PDSCH. When there are a plurality of terminals receiving the same MBS service, the base station may individually transmit the same MBS data to each of the plurality of terminals through different terminal-dedicated PDCCHs and terminal-dedicated PDSCHs.

In the PTM transmission scheme, the base station may transmit a plurality of group common PDSCHs to the terminals. The base station may receive from the terminal HARQ-ACK for the group common PDSCH through the terminal-dedicated PUCCH resource.

When a transport block (TB) for a group common PDSCH is successfully decoded in a terminal, the terminal may transmit an ACK value as HARQ-ACK information. When the terminal does not successfully decode the TB for a unicast PDSCH or a group common PDSCH, the terminal may transmit a NACK value as HARQ-ACK information. Such HARQ-ACK transmission scheme may be referred to as an ACK/NACK-based HARQ-ACK scheme. In general, ACK/NACK-based HARQ-ACK information may be transmitted through a terminal-dedicated PUCCH resource.

For a group common PDSCH, NACK only-based HARQ-ACK scheme may be applied/configured. For example, a terminal may not transmit PUCCH in a case of an ACK value (i.e., when decoding of the received PDSCH succeeds), and transmit PUCCH only in the case of a NACK value (i.e., when decoding of the received PDSCH fails). In general, NACK only-based HARQ-ACK information may be transmitted through a group common PUCCH resource. When a plurality of HARQ-ACKs are transmitted in the NACK only-based HARQ-ACK scheme, HARQ-ACK information including only ACK values is not transmitted, and HARQ-ACK information including at least one NACK value may be transmitted.

In the following examples, ACK/NACK-based HARQ-ACK may be referred to as HARQ-ACK information based on the first HARQ-ACK reporting mode, and NACK only-based HARQ-ACK may be referred to as HARQ-ACK information based on the second HARQ-ACK reporting mode. In addition, the DCI format CRC scrambled by the G-RNTI or G-CS-RNTI may be referred to as a group common DCI format or a multicast DCI format. The group common/multicast DCI format may also be referred to as a group common/multicast PDCCH, and a PDSCH scheduled thereby may be referred to as a group common/multicast PDSCH.

In the present disclosure, the ACK/NACK-based HARQ-ACK transmission scheme is not limited to HARQ-ACK for unicast PDCCH/PDSCH, and as described above, ACK/NACK-based HARQ-ACK transmission scheme may also be applied to HARQ-ACK for multicast PDCCH/PDSCH.

With regard to the above-described SPS, up to 8 SPS configurations may be provided for a terminal. Each SPS configuration may be configured to have a unique SPS configuration index. Among a plurality of SPS configurations, a base station may allocate some to SPS PDSCH transmission for unicast and allocate others to SPS PDSCH transmission for multicast. In this case, a terminal may receive a multicast SPS PDSCH through a PTM transmission scheme. In other words, a multicast SPS PDSCH may be received by a plurality of terminals in a group. Here, HARQ-ACK for a SPS PDSCH may be transmitted per SPS configuration. For it, a PUCCH resource (e.g., a PUCCH resource for HARQ-ACK transmission for a corresponding SPS configuration) may be configured for a terminal through a RRC message per SPS configuration.

Next, the above-described NACK only-based (or second HARQ-ACK reporting mode-based) HARQ-ACK transmission operation is described in detail.

A terminal may be configured to provide HARQ-ACK information for transport block reception associated with G-RNTI or G-CS-RNTI respectively by a higher layer parameter indicating a multicast HARQ feedback option for G-RNTI (e.g., harq-Feedback-Option-Multicast) or by a higher layer parameter indicating a SPS multicast HARQ feedback option for G-CS-RNTI (e.g., sps-HARQ-Feedback-Option-Multicast) according to a first HARQ-ACK reporting mode (i.e., ACK/NACK based HARQ-ACK) or according to a second HARQ-ACK reporting mode (i.e., NACK only-based HARQ-ACK).

For a second HARQ-ACK reporting mode, a terminal may not transmit a PUCCH which will include only HARQ-ACK information having ACK values. When the number of HARQ-ACK information bits exceeds 4, or for first SPS PDSCH reception after activation of SPS PDSCH reception for a SPS configuration, or for a DCI format including associated HARQ-ACK information without scheduling PDSCH reception, a second HARQ-ACK reporting mode may not be applied.

For a second HARQ-ACK reporting mode, when the number of HARQ-ACK information bits is 1, a terminal may transmit a PUCCH only when a HARQ-ACK information bit has a NACK value.

For a second HARQ-ACK reporting mode, when the number of HARQ-ACK information bits is 2, 3, or 4, a terminal may be indicated by a higher layer parameter indicating a mode which supports more than one NACK only feedbacks on the same PUCCH (e.g., moreThanOn-eNackOnly-Mode). Mode1 (or a moreThanOneNackOnly-Mode parameter is not provided) may mean that NACK only HARQ-ACK bits are transformed into ACK/NACK HARQ-ACK bits to multiplex HARQ-ACK bits. Mode2 may mean that a terminal transmits specific sequence or PUCCH transmission corresponding to a combination of more than one NACK only HARQ feedbacks (e.g., select one resource based on HARQ-ACK bit values among a set of resources for PUCCH transmission).

When a terminal tries to multiplex HARQ-ACK information to be provided by a terminal and other UCI in a first PUCCH or PUSCH according to a second HARQ-ACK reporting mode, a terminal may provide HARQ-ACK information according to a first HARQ-ACK reporting mode. Before multiplexing HARQ-ACK information in a PUCCH or a PUSCH, in order to resolve overlapping between a second PUCCH having HARQ-ACK information according to a second HARQ-ACK reporting mode and other PUCCHs, a terminal may consider that a second PUCCH is transmitted when all values of HARQ-ACK information are 'ACK'.

As described above, one PUCCH resource may be selected and transmitted among a plurality of PUCCH resources in order to multiplex a plurality of NACK only-based HARQ-ACK information (e.g., a moreThanOneNack-Only-Mode parameter indicates mode 2). In this case, one PUCCH resource selected to multiplex a plurality of NACK only-based HARQ-ACK may be transmitted on the same time unit (e.g., slot) as other uplink transmission (e.g., other UCI transmission). In this case, whether to multiplex NACK only-based HARQ-ACK and other uplink transmission, and/or how to multiplex them are not clearly determined, so there is a problem that an operation of a base station and a terminal is unclear.

In the present disclosure, a case is assumed that one PUCCH resource is selected and transmitted among a set of a plurality of PUCCH resources to multiplex a plurality of NACK only-based HARQ-ACK (e.g., a moreThanOneN-ackOnly-Mode parameter indicates mode 2). In addition, a case is assumed that one PUCCH transmission selected accordingly (i.e., one PUCCH resource corresponding to a combination of values of a plurality of NACK only HARQ-ACK information bits) and PUCCH and/or PUSCH transmission for other UCI should be transmitted in the same slot. For example, UCI may include SR, HARQ-ACK, CSI (channel state information), etc.

In this case, a variety of examples for multiplexing the selected one PUCCH transmission and PUCCH/PUSCH transmission for other UCI are described below.

Figure 7:
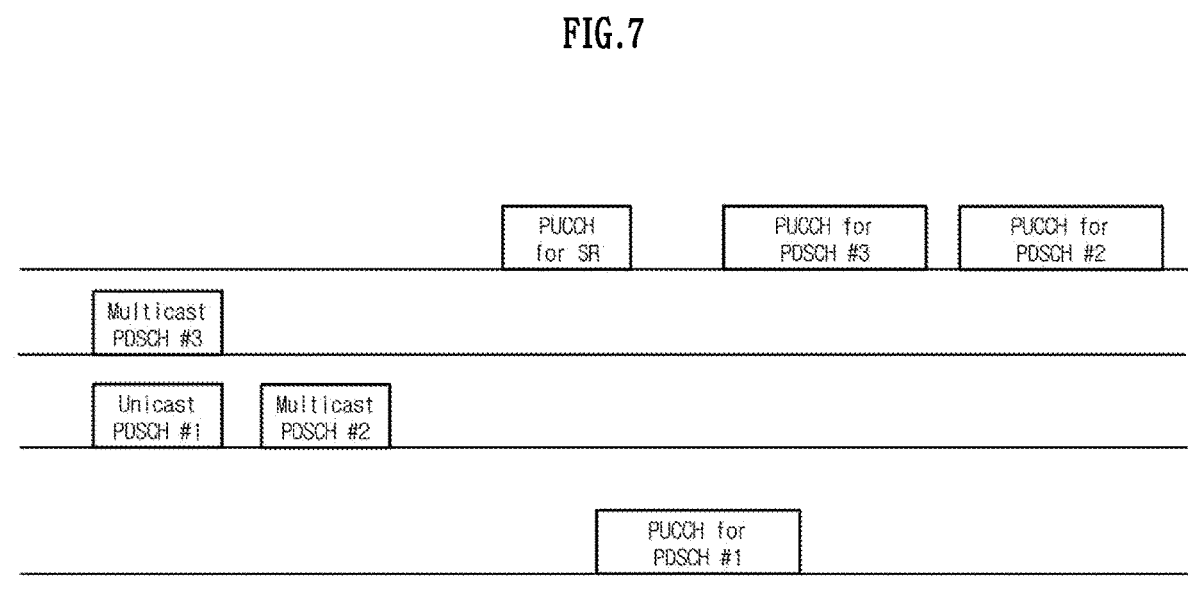

FIG. 7 represents an example on a variety of HARQ-ACK and UCI transmissions to which the present disclosure may be applied.

In an example of FIG. 7, a horizontal axis is associated with a time domain and a vertical axis is associated with a frequency domain, but they are not intended to represent an absolute or relative time position. In other words, an example of FIG. 7 represents a case in which a terminal receives all or part of unicast PDSCHs and multicast PDSCHs transmitted by a FDM scheme or a TDM scheme.

In an example of FIG. 7, a unicast PDSCH may be scheduled by unicast DCI (e.g., DCI/PDCCH which is CRC-scrambled by C-RNTI). A multicast PDSCH may be scheduled by multicast DCI (e.g., DCI/PDCCH which is CRC-scrambled by G-RNTI). In addition, HARQ-ACK for unicast DCI/PDSCH may be ACK/NACK-based HARQ-ACK and HARQ-ACK for multicast DCI/PDSCH may be ACK/NACK-based HARQ-ACK or NACK only-based HARQ-ACK.

For example, a unicast PDCCH/PDSCH and a multicast PDCCH/PDSCH, or a multicast PDCCH/PDSCH and a multicast PDCCH/PDSCH scheduled by a different G-RNTI may be received by FDM or TDM. For example, unicast PDSCH #1 may be transmitted by TDM with multicast PDSCH #2 for G-RNTI #1 and may be transmitted by FDM with multicast PDSCH #3 for G-RNTI #2.

In this case, HARQ-ACK transmission for unicast PDSCH #1 (e.g., a PUCCH for PDSCH #1) and HARQ-ACK transmission for multicast PDSCH #2 (e.g., a PUCCH for PDSCH #2) may correspond to transmission in a different uplink slot (i.e., not overlapping). HARQ-ACK transmission for unicast PDSCH #1 (e.g., a PUCCH for PDSCH #1) and HARQ-ACK transmission for multicast PDSCH #3 (e.g., a PUCCH for PDSCH #3) may correspond to transmission in the same uplink slot (i.e. overlapping). In addition, a case may occur that multicast HARQ-ACK transmission is allocated to the same slot as a PUSCH. In addition, a case may occur that multicast HARQ-ACK transmission is allocated to the same slot as a PUCCH for other UCI (e.g., SR). For these cases, how a terminal will transmit a PUCCH for multicast HARQ-ACK transmission and other PUCCH/PUSCH is not clearly determined.

In the present disclosure, a variety of methods related to multiplexing of other PUCCH/PUSCH transmission and/or a plurality of NACK only-based HARQ-ACK information are described. For example, when transmission of a plurality of NACK only-based HARQ-ACK information and other PUCCH/PUSCH transmission are overlapped or should be transmitted in the same slot, HARQ-ACK information and other PUCCH/PUSCH transmission may be multiplexed and transmitted or received according to one of examples described below or two or more combinations.

Figure 8:
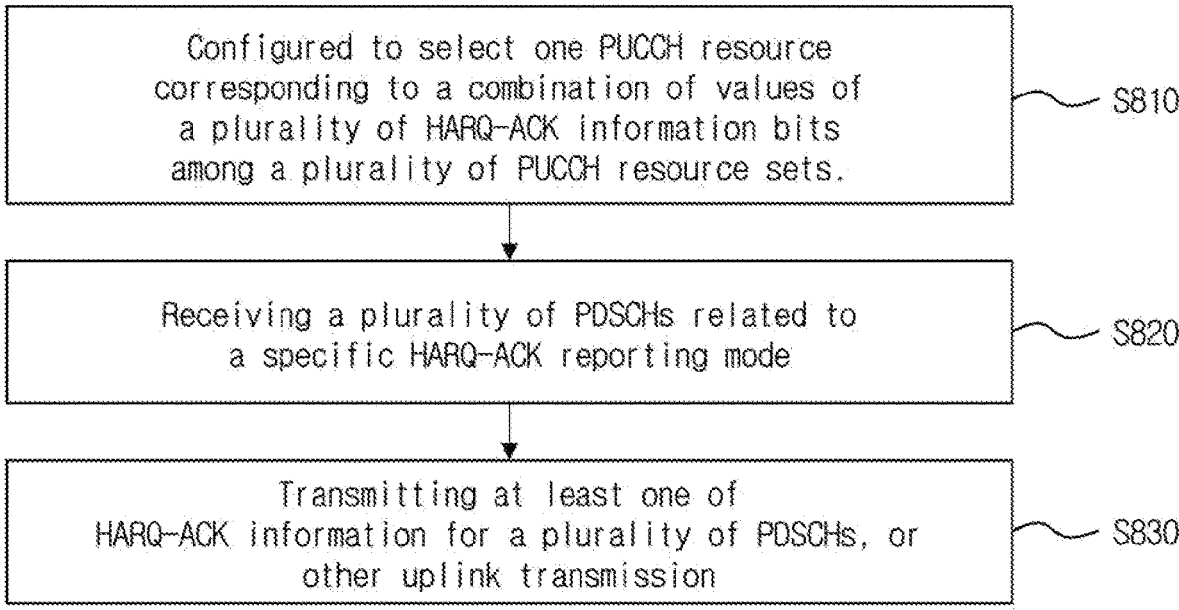
FIG. 8 is a diagram for describing a HARQ-ACK transmission method of a terminal according to an embodiment of the present disclosure.

FIG. 8 is a diagram for describing a HARQ-ACK transmission method of a terminal according to an embodiment of the present disclosure.

In S810, a terminal may be configured to select one PUCCH resource corresponding to a combination of values of a plurality of HARQ-ACK information bits correspond-ing to a plurality of PDSCHs respectively among a plurality of PUCCH resource sets.

For example, more than one NACK only mode (more-ThanOneNackOnly-Mode) parameters may be configured for a terminal or may be configured as mode 2. For example, such a parameter may be configured based on G-RNTI, may be configured based on a cell, or may be configured based on CFR.

In S820, a terminal may receive a plurality of PDSCHs related to a specific HARQ-ACK reporting mode.

For example, a specific HARQ-ACK reporting mode may correspond to a mode that HARQ-ACK information includ-ing only an ACK value is not reported and HARQ-ACK information including a NACK value is reported (i.e., a NACK only-based HARQ-ACK reporting mode).

In S830, a terminal may transmit at least one of HARQ-ACK information for a plurality of PDSCHs, or other uplink transmission.

For example, when one selected PUCCH resource is overlapped with the other uplink transmission, HARQ-ACK information on a plurality of PDSCHs may be determined by assuming that a specific HARQ-ACK reporting mode is transformed into other HARQ-ACK reporting mode. Here, other HARQ-ACK reporting mode may correspond to a mode that an ACK or NACK value based on whether a transport block is successfully decoded is reported (i.e., a ACK/NACK-based HARQ-ACK reporting mode).

For example, when one selected PUCCH resource is overlapped with other uplink transmission, it may include a case in which one selected PUCCH resource and other uplink transmission are positioned in one same slot.

HARQ-ACK information on a plurality of PDSCHs determined based on being transformed into other HARQ-ACK reporting mode may be multiplexed with other uplink transmission and transmitted.

A PUCCH resource that HARQ-ACK information on a plurality of PDSCHs determined based on being transformed into other HARQ-ACK reporting mode is transmitted: may be determined based on a PUCCH resource indicator (PRI) included in DCI which is most recently received among a plurality of DCI scheduling a plurality of PDSCHs respectively, and timing (e.g., K1 value) indication information to a PDSCH and a HARQ feedback; may correspond to one selected PUCCH resource; or may correspond to a PUCCH resource for other uplink transmission.

Here, when a specific HARQ-ACK reporting mode is transformed into other HARQ-ACK reporting mode, it may be applied (only) to a plurality of HARQ-ACK information bits associated with one selected PUCCH resource and it may not be applied to other HARQ-ACK information bits. In other words, HARQ-ACK reporting mode transform may be temporarily applied (only) to a plurality of HARQ-ACK information bits overlapped with other uplink transmission. In other words, if one selected PUCCH resource is not overlapped with other uplink transmission, HARQ-ACK information on a plurality of PDSCHs may be transmitted through one selected PUCCH resource without transforming a HARQ-ACK reporting mode.

Other uplink transmission may include SR and/or CSI. For example, based on a priority of HARQ-ACK information on a plurality of PDSCHs and a priority of other uplink transmission: one of HARQ-ACK information on a plurality of PDSCHs and other uplink transmission may be dropped, or all of them may be multiplexed and transmitted; or may be transmitted through a separate PUCCH/PUSCH.

Figure 9:
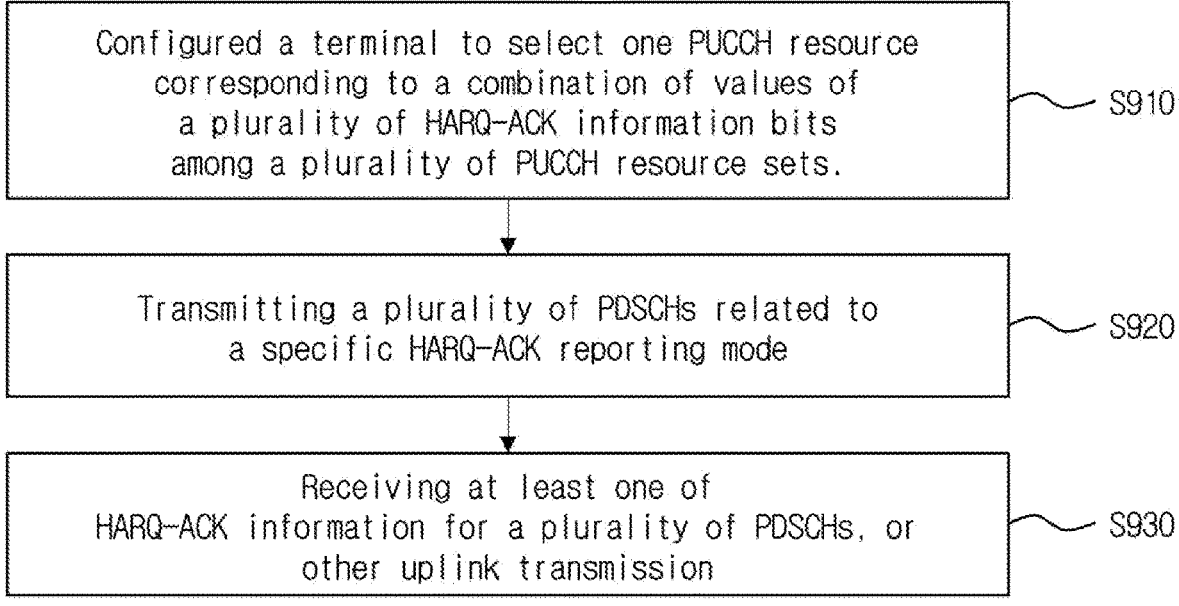
FIG. 9 is a diagram for describing a HARQ-ACK reception method of a base station according to an embodiment of the present disclosure.

FIG. 9 is a diagram for describing a HARQ-ACK reception method of a base station according to an embodiment of the present disclosure.

In S910, a base station may configure to a terminal a mode that one PUCCH resource corresponding to a combination of values of a plurality of HARQ-ACK information bits is selected among a plurality of PUCCH resource sets.

In S920, a base station may transmit a plurality of PDSCHs related to a specific HARQ-ACK reporting mode (e.g., a NACK only HARQ-ACK reporting mode) to at least one terminal including the terminal.

In S930, a base station may receive at least one of HARQ-ACK information for a plurality of PDSCHs, or other uplink transmission from the terminal.

In an example of FIG. 9, examples described in FIG. 8 may be applied equally to HARQ-ACK reporting mode transform according to whether a PUCCH resource selected according to a specific HARQ-ACK reporting mode is overlapped with other uplink transmission, transmission that multiplexing/drop, etc. of HARQ-ACK information on a plurality of PDSCHs and other uplink transmission is applied and others, so an overlapping description is omitted.

A variety of methods for multiplexing HARQ-ACK information including the above-described contents which may be applied to an example of FIG. 8 and FIG. 9 are described below.

Embodiment 1

In the present embodiment, a case is assumed that it is configured by RRC to select one PUCCH resource according to a value of HARQ-ACK bits for a plurality of NACK-only-based HARQ-ACK among multiple PUCCH resources. In this case, when a PUCCH resource selected to multiplex a plurality of NACK-only-based HARQ-ACK is positioned in (or is overlapped with) the same slot as other UCI transmission, a configuration may be changed (or a terminal may temporarily operate unlike a configuration of a base station) to temporarily transform a plurality of NACK-only-based HARQ-ACK into ACK/NACK-based HARQ-ACK and multiplex them.

For example, for specific G-RNTI or a specific cell or a specific CFR, a case is assumed that a base station configures NACK only multiplexing to a terminal in a way of selecting one PUCCH resource according to a value of a plurality of NACK only-based HARQ-ACK bits. In this case, a terminal may operate as follows.

Step 1: When a plurality of NACK only-based HARQ-ACK bits should be transmitted in the same slot, a terminal may select one PUCCH resource according to a value of NACK only-based HARQ-ACK bits.

Step 2: When one PUCCH resource selected in Step 1 is positioned in the same slot as other UCI transmission, a terminal temporarily transforms the plurality of NACK only-based HARQ-ACK into ACK/NACK-based HARQ-ACK. In other words, unlike a configuration of a base station, a terminal itself may change a configuration to temporarily transform the plurality of NACK only-based HARQ-ACK into ACK/NACK-based HARQ-ACK and multiplex them.

For other HARQ-ACK (e.g., HARQ-ACK not overlapped with UCI), a terminal may operate in a way of selecting one PUCCH resource among PUCCH resource sets according to a combination of HARQ-ACK information bits according to a configuration of a base station.

Step 3: A terminal may select a PUCCH resource which will multiplex and transmit HARQ-ACK information transformed into ACK/NACK-based HARQ-ACK with UCI. One of a variety of examples may be applied to a standard for PUCCH resource selection.

For example, a PUCCH resource may be selected based on a kl value and a PRI indicated by last received multicast DCI for a plurality of NACK-only-based HARQ-ACK.

Alternatively, through a PUCCH resource selected in Step 1 (i.e., among a plurality of PUCCH resources, one PUCCH resource corresponding to a combination of values of a plurality of HARQ-ACK information bits), a result from transforming a plurality of NACK only-based HARQ-ACK bits into ACK/NACK-based HARQ-ACK may be multiplexed. Here, other UCI information in Step 2 and a plurality of NACK only-based HARQ-ACK bits transformed into ACK/NACK-based HARQ-ACK may be multiplexed and a result of multiplexing may be transmitted to a PUCCH resource selected in Step 1.

Alternatively, other UCI information in Step 2 and a plurality of NACK only-based HARQ-ACK bits transformed into ACK/NACK-based HARQ-ACK may be multiplexed and a result of multiplexing may be transmitted by using a PUCCH resource determined for other UCI transmission in Step 2.

In Embodiment 1, other UCI may include SR and/or CSI. In this case, at least one of HARQ-ACK and UCI may be dropped or both of them may be transmitted. For example, a standard for whether to drop may follow a priority relation between UCI and a plurality of NACK only-based HARQ-ACK (or a result from transforming it into ACK/NACK-based HARQ-ACK).

First, a terminal may drop other UCI and multiplex a plurality of NACK only-based HARQ-ACK to transmit a PUCCH. For example, it may correspond to a case in which other UCI has a lower priority than a plurality of NACK only-based HARQ-ACK.

Second, a terminal may transform a plurality of NACK only-based HARQ-ACK into ACK/NACK-based HARQ-ACK and multiplex and transmit them with other UCI. For example, it may correspond to a case in which other UCI has the same priority as a plurality of NACK only-based HARQ-ACK.

Third, a terminal may drop a plurality of NACK only-based HARQ-ACK and transmit other UCI. For example, it may correspond to a case in which other UCI has a higher priority than a plurality of NACK only-based HARQ-ACK.

Fourth, a terminal may transform a plurality of NACK only-based HARQ-ACK into ACK/NACK-based HARQ-ACK and multiplex them, and may transmit other UCI through a separate PUCCH or PUSCH. For example, when other UCI has a higher priority than a plurality of NACK only-based HARQ-ACK, a terminal may drop a plurality of NACK only-based HARQ-ACK (according to a configuration of a base station), or may transform them into ACK/NACK-based HARQ-ACK and transmit them.

Embodiment 2

In the present embodiment, a case is assumed that it is configured by RRC to select one PUCCH resource according to a value of HARQ-ACK bits for a plurality of NACK-only-based HARQ-ACK among multiple PUCCH resources. In this case, when a PUCCH resource selected for multiplexing is positioned in the same slot as PUSCH transmission, a terminal may change a configuration to temporarily transform a plurality of NACK-only-based HARQ-ACK into ACK/NACK-based HARQ-ACK and multiplex them.

For example, a PUCCH resource selected by multiplexing N NACK-only-based HARQ-ACK bits with the same priority (according to a configuration of a base station) may be allocated to the same slot as PUSCH transmission. In this case, N NACK-only-based HARQ-ACK bits may be transformed into N ACK/NACK-based HARQ-ACK bits and transformed HARQ-ACK bits may be piggybacked and transmitted to a PUSCH as UCI.

Additionally or alternatively, according to a configuration of a base station, a PUCCH resource selected by multiplexing N NACK-only-based HARQ-ACK bits with the same priority may be allocated to the same slot as PUSCH transmission. In this case, a terminal may drop N NACK-only-based HARQ-ACK and transmit a PUSCH. For example, when a priority of N NACK-only-based HARQ-ACK is lower than a priority of a PUSCH, a terminal may drop N NACK-only-based HARQ-ACK and transmit a PUSCH.

Additionally or alternatively, when a PUCCH resource selected for N NACK-only-based HARQ-ACK bits with the same priority is positioned in the same slot as PUSCH transmission, a terminal may re-select (N-K) NACK-only-based HARQ-ACK bits among N NACK-only-based HARQ-ACK bits and re-select a PUCCH resource to multiplex them. If there is no other UCI or PUSCH transmission in a slot of a reselected PUCCH resource, a terminal may multiplex and transmit (N-K) NACK-only-based HARQ-ACK bits through a reselected PUCCH resource. A terminal may determine a lowest K value that a PUCCH resource reselected for K=1, 2, 3, . . . and other UCI or PUSCH transmission are not overlapped in the same slot. A terminal may transmit HARQ-ACK information multiplexing (N-K) NACK-only-based HARQ-ACK bits through a PUCCH resource reselected for a determined K value.

Embodiment 3

In the present embodiment, a case is assumed that it is configured by RRC to select one PUCCH resource according to a value of HARQ-ACK bits for a plurality of NACK-only-based HARQ-ACK among multiple PUCCH resources. In this case, when a PUCCH resource selected for multiplexing is positioned in the same slot as PUSCH transmission, a terminal may drop a plurality of NACK-only-based HARQ-ACK or may drop PUSCH transmission (according to a priority). Accordingly, a terminal may transmit only a PUCCH selected for a plurality of NACK-only-based HARQ-ACK or an undropped PUSCH.

Additionally or alternatively, when it is configured to transform a plurality of NACK-only-based HARQ-ACK into ACK/NACK-based HARQ-ACK for multiplexing (e.g., when a moreThanOneNackOnly-Mode parameter is not configured or is configured as mode 1), a terminal may transform a plurality of NACK-only-based HARQ-ACK into ACK/NACK-based HARQ-ACK and multiplex them as UCI, and may piggyback and transmit corresponding UCI to a PUSCH.

Embodiment 4

The present embodiment is about an example in which a NACK-only HARQ-ACK reporting mode is transformed into an ACK/NACK-based HARQ-ACK reporting mode when a PUSCH and a multicast PUCCH are multiplexed.

When PUCCH transmission for multicast HARQ-ACK and PUSCH transmission by configured grant or dynamic grant in the same slot occur, a terminal may transmit a PUCCH and/or a PUSCH as follows. Here, a PUSCH by dynamic grant may be a PUSCH allocated to DCI, or may be a RACH MSGA PUSCH, or may correspond to a MSG3 PUSCH by UL grant of RACH MSG2.

Embodiment 4-1

In the present embodiment, it is assumed that a PUCCH and a PUSCH are positioned in the same slot, but are not overlapped and a terminal has a capability to transmit a PUCCH and a PUSCH at the same time.

In this case, as a first example, a terminal may simultaneously transmit a PUCCH for multicast HARQ-ACK and a PUSCH by configured grant or dynamic grant (according to a configuration of a base station). For example, when a PUCCH and a PUSCH for multicast HARQ-ACK are transmission in a different cell, or when PUSCH transmission is a RACH MSGA PUSCH or a MSG3 PUSCH by UL grant of RACH MSG2, a terminal may be configured to simultaneously transmit a PUCCH and a PUSCH for multicast HARQ-ACK (as a RRC message) according to the above-described first example.

As a second example, a terminal may piggyback and transmit UCI for multicast HARQ-ACK to a PUSCH. Here, when multicast HARQ-ACK is NACK-only-based HARQ-ACK, a terminal may transform it into ACK/NACK-based HARQ-ACK and piggyback and transmit it to a PUSCH. In other words, when PUCCH transmission for one or a plurality of NACK-only-based HARQ-ACK transmission takes place with PUSCH transmission in the same slot, a terminal may transform all NACK-only-based HARQ-ACK transmission into ACK/NACK-based HARQ-ACK transmission to configure UCI and piggyback and transmit it to a PUSCH.

A terminal may transmit multicast HARQ-ACK by selecting one of a first example or a second example according to a configuration of a base station. Alternatively, when other PUCCH transmission for unicast HARQ-ACK or other multicast HARQ-ACK is overlapped in the same slot, according to a second example, a terminal may piggyback UCI to a PUSCH and multiplex and transmit overlapped HARQ-ACK. Here, when multicast HARQ-ACK is NACK-only-based HARQ-ACK, a terminal may transform it into ACK/NACK-based HARQ-ACK and multiplex it. Alternatively, a terminal may transmit a PUCCH and a PUSCH with the same priority according to a second example and transmit a PUCCH and a PUSCH with a different priority according to a first example.

Embodiment 4-2

In the present embodiment, it is assumed that a PUCCH and a PUSCH are positioned in the same slot, but are not overlapped and a terminal has a capability not to simultaneously transmit a PUCCH and a PUSCH, or that a PUCCH and a PUSCH are allocated to the same slot and are overlapped.

In this case, as a first example, a terminal may drop a PUCCH and transmit a PUSCH or may drop a PUSCH and transmit a PUCCH (according to a configuration of a base station).

For example, a terminal may transmit one with a higher priority between a PUCCH and a PUSCH and drop one with a lower priority.

Alternatively, a terminal may drop a PUCCH and transmit a PUSCH or may drop a PUSCH and transmit a PUCCH according to a configuration of a base station.

Alternatively, a terminal may drop a PUCCH for multicast HARQ-ACK and transmit a PUSCH.

Alternatively, a terminal may drop a PUCCH for NACK-only-based HARQ-ACK and transmit a PUSCH.

Alternatively, a terminal may transmit a PUCCH for NACK-only-based HARQ-ACK and transmit a PUSCH.

Alternatively, a terminal may transmit a PUSCH according to dynamic grant and transmit a PUCCH.

Alternatively, a terminal may drop a PUSCH according to configured grant and transmit a PUCCH.

Alternatively, a terminal may drop a PUCCH for multicast SPS HARQ-ACK and transmit a PUSCH.

Alternatively, a terminal may transmit a PUCCH for dynamic multicast HARQ-ACK and drop a PUSCH.

Alternatively, when PUSCH transmission is a RACH MSGA PUSCH or a MSG3 PUSCH by UL grant of RACH MSG2, a terminal may drop a PUCCH for multicast HARQ-ACK and transmit a PUSCH (according to a configuration of a base station or all the time).

As a second example, a terminal may piggyback and transmit UCI for multicast HARQ-ACK to a PUSCH.

Here, when multicast HARQ-ACK is NACK-only-based HARQ-ACK, a terminal may transform it into ACK/NACK-based HARQ-ACK and piggyback and transmit it to a PUSCH. In other words, when PUCCH transmission for one or a plurality of NACK-only-based HARQ-ACK transmission takes place with PUSCH transmission in the same slot, a terminal may transform all NACK-only-based HARQ-ACK transmission into ACK/NACK-based HARQ-ACK transmission and piggyback and transmit it to a PUSCH as UCI.

A terminal may transmit multicast HARQ-ACK by selecting one of a first example or a second example according to a configuration of a base station.

Alternatively, when other PUCCH transmission for unicast HARQ-ACK or other multicast HARQ-ACK is overlapped in the same slot, according to a second example, a terminal may piggyback UCI through a PUSCH and multiplex and transmit overlapped HARQ-ACK. Here, when multicast HARQ-ACK is NACK-only-based HARQ-ACK, a terminal may transform it into ACK/NACK-based HARQ-ACK and multiplex it.

Alternatively, a terminal may transmit a PUCCH and a PUSCH with the same priority according to a second example and transmit a PUCCH and a PUSCH with a different priority according to a first example.

When PUSCH transmission is a RACH MSGA PUSCH or a MSG3 PUSCH by UL grant of RACH MSG2, a terminal may piggyback and transmit UCI for multicast HARQ-ACK to a PUSCH according to a configuration of a base station. Here, when multicast HARQ-ACK is NACK-only-based HARQ-ACK, a terminal may transform it into ACK/NACK-based HARQ-ACK and piggyback and transmit it to a PUSCH.

When PUSCH transmission is a RACH MSGA PUSCH or a MSG3 PUSCH by UL grant of RACH MSG2, according to the above-described various examples, a terminal may drop a PUCCH for multicast HARQ-ACK, or may piggyback and transmit UCI for multicast HARQ-ACK to a PUSCH. In such a RACH process, when PUCCH #1 transmitting HARQ-ACK for MSG4 transmission and PUCCH #2 for multicast HARQ-ACK are transmitted in the same slot, a terminal may determine whether to multiplex PUCCH #1 and PUCCH #2 according to a configuration of a base station.

For example, when a base station is configured to perform multiplexing, a terminal may multiplex and transmit HARQ-ACK for multicast HARQ-ACK and HARQ-ACK for MSG4 transmission through PUCCH #1 or PUCCH #2 resource. When a base station is not configured to perform multiplexing, a terminal may transmit PUCCH #1 transmitting HARQ-ACK for MSG4 transmission and drop PUCCH #2 for multicast HARQ-ACK.

Figure 10:
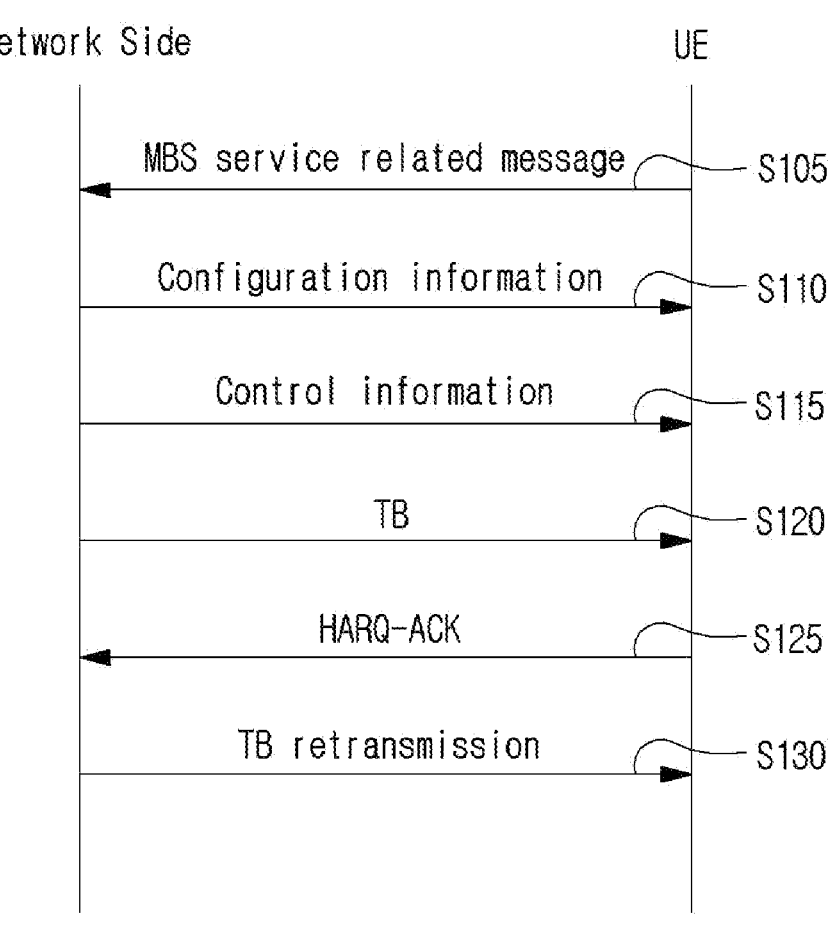
FIG. 10 is a diagram for describing a signaling process of a network side and a terminal according to an embodiment of the present disclosure.

FIG. 10 is a diagram for describing a signaling procedure of the network side and the terminal according to an embodiment of the present disclosure.

FIG. 10 shows an example of signaling between a network side and a terminal (UE) in a situation to which the examples (e.g., embodiments 1, 2, 3, 4 or its detailed examples, and a combination of one or more thereof) of the present disclosure described above may be applied.

Here, the UE/network side is exemplary, and may be replaced with various devices to be described with reference to FIG. 11. FIG. 10 is for convenience of description, and does not limit the scope of the present disclosure. Also, some step(s) shown in FIG. 10 may be omitted depending on circumstances and/or settings. In addition, in the operation of the network side/UE of FIG. 10, the above-described uplink transmission/reception operation and the like may be referred to or used.

In the following description, the network side may be one base station including a plurality of TRPs, or may be one cell including a plurality of TRPs. Alternatively, the network side may include a plurality of remote radio heads (RRHs)/remote radio units (RRUs). As an example, an ideal/non-ideal backhaul may be configured between TRP 1 and TRP 2 included in the network side. In addition, although the following description is based on a plurality of TRPs, such description may be equivalently extended and applied to transmission through a plurality of panels/cells, and may also be extended and applied to transmission through a plurality of RRHs/RRUs.

In addition, although described with reference to "TRP" in the following description, "TRP" may be replaced with and applied to a panel, an antenna array, a cell (e.g., a macro cell/small cell/pico cell, etc.), TP (transmission point), base station (base station, gNB, etc.) as described above. As described above, the TRP may be distinguished according to information (e.g., CORESET index, ID) on the CORESET group (or CORESET pool).

As an example, when one UE is configured to perform transmission and reception with a plurality of TRPs (or cells), this may mean that a plurality of CORESET groups (or CORESET pools) are configured for the one UE. The configuration of such CORESET group (or CORESET pool) may be performed through higher layer signaling (e.g., RRC signaling, etc.).

In addition, the base station may mean a generic term for an object that transmits/receives data to and from the UE. For example, the base station may be a concept including one or more TPs (Transmission Points), one or more TRPs (Transmission and Reception Points), or the like. In addition, the TP and/or TRP may include a panel, a transmission and reception unit, and the like of the base station.

The UE may enter the RRC_CONNECTED mode, and may report a message indicating one or more interested MBS services to the network side (S105).

Here, the UE may transmit the message to the network side through at least one of UCI, MAC CE (Control Element), or RRC message. In addition, the MBS service of interest in the message may mean one of TMGI and G-RNTI listed in a DL message received from the network side.

For example, the DL message may be a service availability message listing TMGI #1, TMGI #3, TMGI #5, and TMGI #10. When the UE is interested in TMGI #5, the UE may indicate the order of TMGI #5 in the message. That is, the terminal may report '3' to the network side.

As an additional example, the DL message may be a service availability message listing G-RNTI #1, G-RNTI #3, G-RNTI #5, and G-RNTI #10. When the UE is interested in G-RNTI #10, the UE may indicate the order of G-RNTI #10 in the message. That is, the UE may report '4' to the network side.

For example, the operation of the UE (100 or 200 in FIG. 11) of the above-described step S105 transmitting the message to the network side (200 or 100 in FIG. 12) may be implemented by the device of FIG. 12 to be described below. For example, referring to FIG. 11, the one or more processors 102 may control one or more transceivers 106 and/or one or more memories 104, etc. to transmit the message, and the one or more transceivers 106 may transmit the message to the network side.

Upon receiving the message, the network side may transmit configuration information to the UE by an RRC message (S110).

For example, the configuration information may include CFR (common frequency resource) configuration information, one or more group common PDSCH configuration information including TCI states for one or more G-RNTI values, search space configuration information including TCI states for one or more G-RNTI values.

Here, the RRC message may be a group common message transmitted through a PTM MCCH (Multicast Control Channel) or a UE-dedicated message transmitted through a UE-specific DCCH (Dedicated Control Channel).

In addition, CFR may include DL CFR and UL CFR. For example, one DL CFR may provide group common PDCCH and group common PDSCH transmission resources for MBS transmission or reception. One UL CFR may provide HARQ-ACK PUCCH resources for group common PDSCH reception. One CFR may be one MBS-specific BWP or one UE-specific BWP. Additionally or alternatively, one or a plurality of CFRs may be configured in one UE-specific BWP. One CFR may have a linkage relationship with one UE-specific BWP.

The terminal may be configured with at least a G-RNTI value for each MBS CFR or each serving cell. GC-CS-RNTI may be configured/used for activation, retransmission or release of one or more group common SPS configurations.

When the UE is not configured with GC-CS-RNTI for CFR or serving cell, and CS-RNTI is configured for CFR or serving cell, the UE may use CS-RNTI for activating, retransmitting, or releasing of one or more group common SPS configurations.

The network side may associate one GC-CS-RNTI value with a TMGI list or a G-RNTI list. In this case, the network side may provide a TMGI list or a G-RNTI list associated with the GC-CS-RNTI value.

In addition, configuration information of each PDSCH (e.g., 'PDSCH-config') may be configured as shown in Table 6 as a minimum information element for multicast and/or broadcast.

TABLE 6

```
PDSCH-Config ::= SEQUENCE {
dataScramblingIdentityPDSCH INTEGER (0..1023) OPTIONAL, --
Need S
dmrs-DownlinkForPDSCH-MappingTypeA SetupRelease {DMRS-
DownlinkConfig} OPTIONAL, -- Need M
dmrs-DownlinkForPDSCH-MappingTypeB SetupRelease {DMRS-
DownlinkConfig} OPTIONAL, -- Need M
tci-StatesToAddModList SEQUENCE (SIZE (1..maxNrofTCI-States))
OF TCI-State OPTIONAL, -- Need N
tci-StatesToReleaseList SEQUENCE (SIZE (1..maxNrofTCI-
States)) OF TCI-StateId OPTIONAL, -- Need N
vrb-ToPRB-Interleaver ENUMERATED {n2, n4} OPTIONAL, -- Need S
```

TABLE 6-continued

```
resourceAllocation ENUMERATED {resourceAllocationType0,
resourceAllocationType1, dynamicSwitch},
pdsch-TimeDomainAllocationList SetupRelease {PDSCH-
TimeDomainResourceAllocationList} OPTIONAL, -- Need M
pdsch-AggregationFactor ENUMERATED {n2, n4, n8} OPTIONAL, -
- Need S
rateMatchPatternToAddModList SEQUENCE (SIZE
(1..maxNrofRateMatchPatterns)) OF RateMatchPattern OPTIONAL,
-- Need N
rateMatchPatternToReleaseList SEQUENCE (SIZE
(1..maxNrofRateMatchPatterns)) OF RateMatchPatternId
OPTIONAL, -- Need N
rateMatchPatternGroup1 RateMatchPatternGroup OPTIONAL,
Need R
rateMatchPatternGroup2 RateMatchPatternGroup OPTIONAL,
Need R
rbg-Size ENUMERATED {config1, config2},
mcs-Table ENUMERATED {qam256, qam64LowSE} OPTIONAL, -- Need S
maxNrofCodeWordsScheduledByDCI ENUMERATED {n1, n2}
. . . }
```

For example, the operation of the UE (100 or 200 in FIG. 11) of the above-described step S110 receiving configuration information from the network side (200 or 100 in FIG. 11) may be implemented by the device of FIG. 11 to be described below. For example, referring to FIG. 11, the one or more processors 102 may control one or more transceivers 106 and/or one or more memories 104, etc. to receive the configuration information, and the one or more transceivers 106 may receive the configuration information from the network side.

The UE may receive control information from the network side (S115). For example, the UE may receive downlink control information (DCI) for scheduling/activating/releasing uplink/downlink transmission from the network side.

Specifically, when the search space is configured for the configured CFR, the UE may monitor the PDCCH in the SS (search space) configured in the configured CFR, to receive DCI CRC scrambled with G-RNTI or G (group)-CS (configured scheduling)-RNTI.

For example, the operation of the UE (100 or 200 in FIG. 11) of the above-described step S115 receiving control information from the network side (200 or 100 in FIG. 11) may be implemented by the device of FIG. 11 to be described below. For example, referring to FIG. 11, the one or more processors 102 may control one or more transceivers 106 and/or one or more memories 104, etc. to receive the control information, and the one or more transceivers 106 may receive the control information from the network side.

The UE may receive the TB from the network side (S120).

Specifically, when the data unit is available on the MTCH of the MBS radio bearer (MRB) for the MBS service, the network side may construct and transmit a TB including the data unit for an SPS PDSCH occasion associated with the MTCH of the MRB for the MBS service, or associated with TMGI of the MBS service, or associated with a short ID of the MBS service, or associated with G-RNTI mapped to the MBS service, according to the service-to-resource mapping.

For group common dynamic scheduling of the TB, the network side may transmit DCI through PDCCH to the UE. The corresponding DCI may be CRC scrambled by G-RNTI, G-CS-RNTI, or CS-RNTI. The PDCCH may be implemented as a group common PDCCH or a UE-specific PDCCH.

For example, the DCI may include at least one of an identifier for the DCI format, a carrier indicator, a bandwidth part indicator, frequency domain resource assignment, time domain resource assignment, VRB-to-PRB mapping, PRB bundling size indicator, rate matching indicator, ZP CSI-RS trigger, MCS, NDI, RV, HARQ process number, downlink assignment index, TPC command for scheduled PUCCH, PUCCH resource indicator, PDSCH-to-HARQ_feedback timing indicator, an antenna port, a transmission configuration indication, an SRS request, a DMRS sequence initialization, or a priority indicator.

For group common dynamic scheduling, by group common or UE-specific RRC message or by group common or UE-specific MAC CE, the network side may provide with UE one or more of the service-resource mappings for the MBS service identified by TMGI or G-RNTI or GC-CS-RNTI. Data of the MBS service may be carried through MBS radio bearer (MRB) of a multicast traffic logical channel, that is, MTCH associated to the MBS service. RRC message may be a group common message transmitted through PTM MCCH (Multicast Control Channel) or UE-dedicated message transmitted through UE-specific DCCH (Dedicated Control Channel). The DCI scheduling PDSCH carrying the MBS service data may additionally indicate at least one of short ID, MTCH ID, MRB ID, G-RNTI value, and a TMGI value for the MBS service.

When receiving DCI CRC scrambled by G-RNTI that the UE is interested to receive, the UE may determine MBS service(s) associated with one or more of short ID, MTCH ID, MRB ID, G-RNTI value, and a TMGI value for each PDSCH occasion, based on mapping between MBS service and HPN indicated in the DCI, and/or mapping between MBS service and short ID(s) indicated in the DCI.

Then, when UE is interested in the determined MBS service(s), the UE may receive PDSCH transmission scheduled by the DCI. When the UE is not interested in the determined MBS service(s), UE may not receive PDSCH transmission scheduled by the DCI.

For example, the operation of the UE (100 or 200 in FIG. 11) of the above-described step S120 receiving the TB from the network side (200 or 100 in FIG. 11) may be implemented by the device of FIG. 11 to be described below. For example, referring to FIG. 11, the one or more processors 102 may control one or more transceivers 106 and/or one or more memories 104, etc. to receive the TB, and the one or more transceivers 106 may receive the TB from the network side.

Upon receiving group common DCI indicating PUCCH resource(s) for MBS HARQ-ACK, the UE may transmit HARQ-ACK through PUCCH after a PDSCH reception scheduled by the DCI (S125). That is, according to decoding status of PDSCH transmission, the UE may transmit HARQ feedback to the network side.

In the case of PTM scheme 1, group common DCI may indicate a single PUCCH resource indicator and a single PDSCH-to-HARQ_feedback timing indicator at least for ACK/NACK based HARQ-ACK.

Specifically, in the case of UE-specific PUCCH resource allocation for ACK/NACK based HARQ-ACK for group common DCI, different UEs in the corresponding group (unless 'PUCCH-config' for multicast is configured) may be configured with different values of at least 'PUCCH-Resource' and 'dl-DataToUL-ACK' in UE-dedicated 'PUCCH-config' for multicast or for unicast. Different UEs may be allocated with different PUCCH resources, by the same PUCCH resource indicator and the same 'PDSCH-to-HARQ_feedback timing indicator of the group common DCI.

In the case of PTP retransmission, the PUCCH resource indicator and the PDSCH-to-HARQ_feedback timing indicator in the UE-specific DCI may be interpreted based on 'PUCCH-config' for unicast, regardless of whether 'PUCCH-config' for multicast is configured or not.

Here, PRI (PUCCH Resource Indicator) may be indicated by group common DCI as follows.

As an example, UE-specific PRI list may be included in the DCI (option 1A-1). Each PRI in the corresponding list may indicate an entry corresponding to a candidate 'pucch-ResourceId' value of 'PUCCH-config' for allocation of the same PUCCH resource or different PUCCH resources for different UEs in the group receiving the same DCI. Different PRI of DCI may indicate different entry in 'PUCCH-config.'

Here, a candidate 'pucch-ResourceId; value may be configured by RRC, and a different 'pucch-ResourceId' value may be configured for a different UE in the same group at least in multicast PUCCH-config.

As an additional example, a group common PRI may be included in the DCI (option 1-A-2). A single group common PRI may indicate a specific entry for a candidate 'pucch-ResourceId' value in UE-specific 'PUCCH-config' for allocation of the same or different PUCCH resources for all UEs in the group.

In addition, a candidate 'pucch-ResourceId' value may be configured by RRC. Different 'pucch-ResourceId' value may be configured for different UE in the same group at least in 'PUCCH-config' for multicast.

When 'PUCCH-config' for multicast is configured for HARQ-ACK for group common PDSCH scheduled by the group common DCI, the UE may assume that the PRI of the group common DCI indicates an entry corresponding to a candidate 'pucch-ResourceId' value in 'PUCCH-config' for multicast.

When 'PUCCH-config' for multicast is not configured for HARQ-ACK for group common PDSCH scheduled by the group common DCI, the UE may assume that the PRI of the group common DCI indicates an entry corresponding to a candidate 'pucch-ResourceId' value in 'PUCCH-config' for unicast.

K1 (PDSCH-to-HARQ_feedback timing indicator) may be indicated by group common DCI as follows.

As an example, UE-specific K1 value list may be included in the DCI (option 1B-1). Each K1 in the list may indicate the same UL slot or different UL (sub-)slot for different UE in the group.

For example, Different K1 values may be allocated to different UEs. That is, K1 may be allocated to UE1, K2 may be allocated to UE2, K3 may be allocated to UE3.

As an additional example, multiple UEs may share K1 value. For example, UE1 and UE2 may share K1 value, UE3 and UE4 may share K2 value.

As an additional example, one K1 value may be a reference, and other K1 value may be allocated based on the reference. {K1_ref, K1_offset list} may be indicated by DCI.

For example, UE1 may use K1_ref, UE2 may use K1_ref+K1_offset1, UE3 may use K1_ref+K1_offset2.

As an additional example, group common K1 value may be included in the DCI (option 1B-2). For example, a single K1 value may indicate an entry corresponding to a candidate 'dl-DataToUL-ACK' values in UE-specific 'PUCCH-config' for allocation of the same or different PUCCH resources for all UEs in the group receiving the DCI. This may be applied for the case that a DCI format is configured in UE-specific 'PUCCH-config' for the K1 value.

As an additional example, a candidate 'dl-DataToUL-ACK' value may be configured by RRC, and may be differently configured for different UE in the same group at least in 'PUCCH-config' for multicast.

As an additional example, when 'PUCCH-config' for multicast is configured for HARQ-ACK for group common PDSCH scheduled by group common DCI, UE may assume that K1 value of the group common DCI indicates an entry corresponding to a candidate 'dl-DataToUL-ACK' value in 'PUCCH-config' for multicast.

As an additional example, when 'PUCCH-config' for multicast is not configured for HARQ-ACK for group common PDSCH scheduled by group common DCI, UE may assume that K1 value of the group common DCI indicates an entry corresponding to a candidate 'dl-DataToUL-ACK' value in 'PUCCH-config' for unicast.

In addition, when the UE receives group common DCI CRC scrambled by G-RNTI and/or UE-specific DCI CRC scrambled by C-RNTI, and when Type-1 HARQ-ACK codebook is configured for 'PUCCH-config' for multicast and/or 'PUCCH-config' for unicast, UE may construct TDRA (Time Domain Resource Allocation) to generate Type-1 HARQ-ACK codebook for HARQ-ACK(s) for group common PDSCH scheduled by group common DCI and/or UE-specific PDSCH scheduled by UE-specific DCI.

When TB decoding in a PDSCH transmission occasion is not successful, UE may transmit HARQ NACK to the network side through a PUCCH resource in the configured UL CFR.

Using PUCCH resource, the UE may transmit HARQ-ACK for other PDSCH transmissions such as unicast SPS PDSCH, dynamic unicast PDSCH, PTP retransmission and/or dynamic group common PDSCH.

Here, for multiplexing HARQ-ACKs on PUCCH in a (sub)slot for SPS PDSCH for multicast, SPS PDSCH for unicast, dynamically scheduled multicast PDSCH, and/or dynamically scheduled unicast PDSCH, UE may construct a codebook based on one or more of the above options.

When RSRP threshold is configured, the UE may use NACK only based HARQ-ACK based on the measured RSRP of a serving cell. When the measured RSRP is higher than a threshold, NACK only based HARQ-ACK may be transmitted through group common PUCCH resource indicated by PRI of DCI. When the measured RSRP is lower than the threshold, NACK only based HARQ-ACK may be transformed into ACK/NACK based HARQ-ACK on UE-specific PUCCH resource indicated by PRI of DCI.

Meanwhile, when the 'pdsch-AggregationFactor' is configured for a G-RNTI or when 'repetition_number' is indicated by the network side by DCI, the TB scheduled by group common DCI may be repeated for Nth HARQ transmission of the TB within each symbol allocation among each of the 'pdsch-AggregationFactor' consecutive slots or among each of the 'repetition_number' consecutive slots, if configured.

For example, the operation of the UE (100 or 200 in FIG. 11) of the above-described step S125 transmitting the HARQ-ACK to the network side (200 or 100 in FIG. 11) may be implemented by the device of FIG. 11 to be described below. For example, referring to FIG. 11, the one or more processors 102 may control one or more transceivers 106 and/or one or more memories 104, etc. to transmit the HARQ-ACK, and the one or more transceivers 106 may transmit the HARQ-ACK to the network side.

Receiving HARQ NACK of a TCI state, the network side may retransmit, using the TCI state, PDCCH and PDSCH in the DL CFR configured for retransmission of TB (S130).

UE may monitor group common and/or UE-specific PDCCH using the TCI state for a search space configured in DL CFR to receive a retransmission of the TB. The network side may retransmit the TB to one of the UEs in the group by UE-specific PDCCH. Meanwhile, other UE(s) may not receive the retransmission of the TB, as it has successfully received the TB.

When the UE receives the PDCCH for the retransmission of the TB, the UE may receive the PDSCH scheduled by the DCI of the PDCCH. When the UE successfully decodes the TB in the PDSCH, the UE may consider that the decoded TB is associated with MTCH, MRB, TMGI, G-RNTI and/or short ID of MBS service, based on mapping between MBS service and HPN (HARQ Process Number) indicated by the DCI, and/or mapping between MBS service and short ID(s) indicated by the DCI.

When TB decoding in PDSCH transmission occasion is successful, the UE may transmit HARQ ACK to the network side through PUCCH resource in UL CFR configured according to the above-described procedure. Using PUCCH resource, the UE may transmit HARQ-ACK for other PDSCH transmission such as unicast SPS PDSCH, dynamic unicast PDSCH, PTP retransmission and/or dynamic group common PDSCH.

In this case, for multiplexing HARQ-ACKs on PUCCH in a (sub)slot for SPS PDSCH for multicast, SPS PDSCH for unicast, dynamically scheduled multicast PDSCH, and/or dynamically scheduled unicast PDSCH, the UE may construct a codebook based on one or more of the above-described options/embodiments.

For example, the operation of the UE (100 or 200 in FIG. 11) of the above-described step S130 receiving TB retransmission from the network side (200 or 100 in FIG. 11) may be implemented by the device of FIG. 11 to be described below. For example, referring to FIG. 11, the one or more processors 102 may control one or more transceivers 106 and/or one or more memories 104, etc. to receive TB retransmission, and the one or more transceivers 106 may receive TB retransmission from the network side.

General Device to which the Present Disclosure May be Applied

Figure 11:
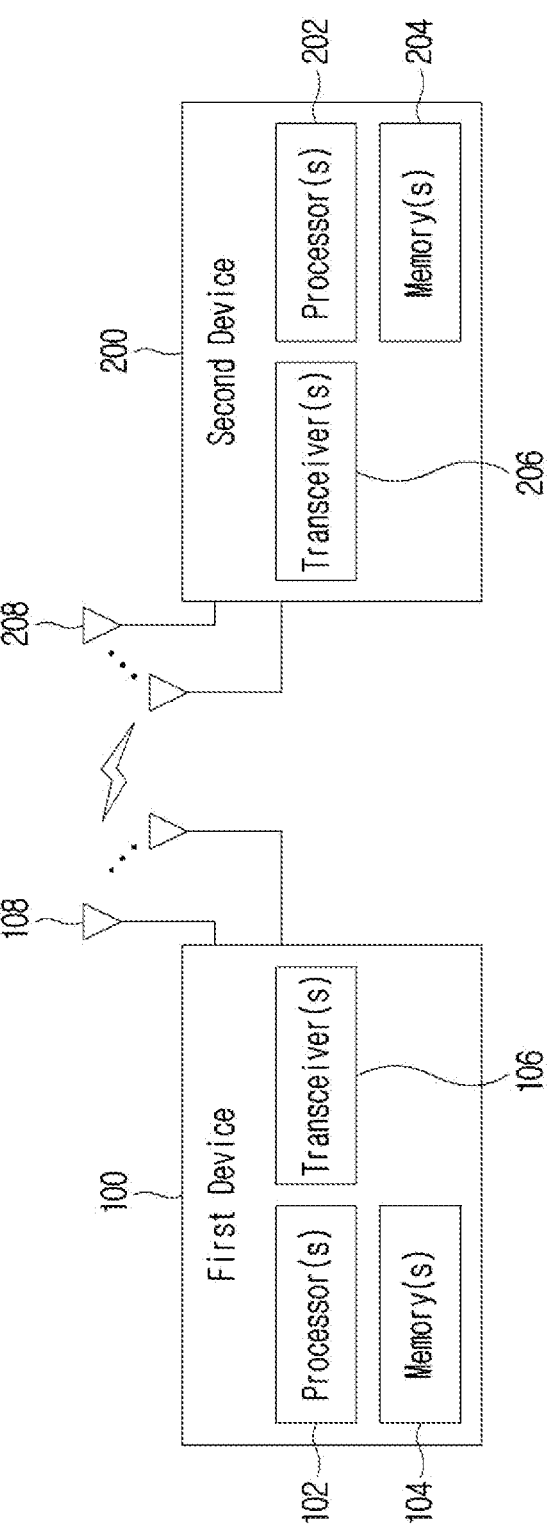
FIG. 11 illustrates a block diagram of a wireless communication device according to an embodiment of the present disclosure.

FIG. 11 illustrates a block diagram of a wireless communication device according to an embodiment of the present disclosure.

In reference to FIG. 11, a first wireless device 100 and a second wireless device 200 may transmit and receive a wireless signal through a variety of radio access technologies (e.g., LTE, NR).

A first device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure.

For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104.

A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

A method proposed by the present disclosure is mainly described based on an example applied to 3GPP LTE/LTE-A, 5G system, but may be applied to various wireless communication systems other than the 3GPP LTE/LTE-A, 5G system.

What is claimed:

1. A method comprising:
receiving, by a terminal from a network, an indication of a second hybrid automatic repeat request (HARQ)-acknowledgement (ACK) reporting mode; and
transmitting, by the terminal to the network, HARQ-ACK information multiplexed with another uplink transmission,
wherein, based on the terminal reporting more than one HARQ-ACK information bit, the terminal selects one physical uplink control channel (PUCCH) resource based on values of the HARQ-ACK information bits from a set of PUCCH resources, wherein the number of HARQ-ACK information bits is 2, 3, or 4,
wherein the terminal generates the HARQ-ACK information bits for the second HARQ-ACK reporting mode,
wherein, based on that the terminal is to multiplex second multicast HARQ-ACK information according to the second HARQ-ACK reporting mode with the another uplink transmission in the selected one PUCCH resource, the terminal provides HARQ-ACK information to be multiplexed according to a first HARQ-ACK reporting mode, and
wherein the HARQ-ACK information to be multiplexed that is provided according to the first HARQ-ACK reporting mode is distinguished from first multicast HARQ-ACK information according to the first HARQ-ACK reporting mode.

2. The method according to claim 1, wherein:
the HARQ-ACK information provided according to the first HARQ-ACK reporting mode is multiplexed with the another uplink transmission and transmitted.

3. The method according to claim 1, wherein the PUCCH resource, in which the HARQ-ACK information provided according to the first HARQ-ACK reporting mode is transmitted, is determined based on a PUCCH resource indicator (PRI) included in DCI which is most recently received among a plurality of downlink control information (DCI) scheduling a plurality of physical downlink shared channels (PDSCHs) respectively, and timing indication information to a PDSCH and a HARQ feedback.

4. The method according to claim 1, wherein the PUCCH resource, in which the HARQ-ACK information provided according to the first HARQ-ACK reporting mode is transmitted, corresponds to the selected one PUCCH resource.

5. The method according to claim 4, wherein the PUCCH resource, in which the HARQ-ACK information provided according to the first HARQ-ACK reporting mode is transmitted, corresponds to the PUCCH resource for the other uplink transmission.

6. The method according to claim 1, wherein:
the second HARQ-ACK reporting mode corresponds to a mode that HARQ-ACK information including only an ACK (acknowledgement) value is not transmitted and HARQ-ACK information including a NACK (non-acknowledgement) value is transmitted, and the second HARQ-ACK reporting mode corresponds to a NACK-only mode, and
the first HARQ-ACK reporting mode corresponds to the mode that the ACK value or the NACK value based on whether a transport block is successfully decoded is generated.

7. The method according to claim 1, wherein:
a parameter for more than one NACK only modes is provided for the terminal.

8. The method according to claim 7, wherein:
the parameter is configured based on a G-RNTI (Group-Radio Network Temporary Identifier), based on a cell, or based on a CFR (common frequency resource).

9. The method according to claim 1, wherein:

multiplexing, in the selected one PUCCH resource, the second multicast HARQ-ACK information according to the second HARQ-ACK reporting mode and the another uplink transmission is based on that the second multicast HARQ-ACK information according to the second HARQ-ACK reporting mode and the another uplink transmission are positioned in a same slot.

10. The method according to claim 1, wherein:

providing the HARQ-ACK information according to the first HARQ-ACK reporting mode is applied to a plurality of HARQ-ACK information bits associated with the selected one PUCCH resource or temporarily.

11. The method according to claim 1, wherein:

based on the second multicast HARQ-ACK information according to the second HARQ-ACK reporting mode and the another uplink transmission not being multiplexed, the second multicast HARQ-ACK information according to the second HARQ-ACK reporting mode is transmitted through the selected one PUCCH resource.

12. The method according to claim 1, wherein:

the another uplink transmission includes at least one of a scheduling request (SR) or channel state information (CSI) reports.

13. The method according to claim 1, wherein based on a priority of HARQ-ACK information on a plurality of PDSCHs and the priority of the other uplink transmission:

HARQ-ACK information on the plurality of PDSCHs is transmitted and the other uplink transmission is dropped, HARQ-ACK information on the plurality of PDSCHs and the other uplink transmission are multiplexed and transmitted, or HARQ-ACK information on the plurality of PDSCHs is dropped and the other uplink transmission is transmitted, HARQ-ACK information on the plurality of PDSCHs and the other uplink transmission are transmitted through a separate PUCCH or physical uplink shared channel (PUSCH).

14. A terminal comprising:

at least one transceiver; and at least one processor connected to the at least one transceiver, wherein the at least one processor is configured to:

receive, from a network through the at least one transceiver, an indication of a second hybrid automatic repeat request (HARQ)-acknowledgement (ACK) reporting mode; and transmit, to the network through the at least one transceiver, HARQ-ACK information multiplexed with another uplink transmission, wherein, based on the terminal reporting more than one HARQ-ACK information bit, the terminal selects one physical uplink control channel (PUCCH) resource based on values of the HARQ-ACK information bits from a set of PUCCH resources, wherein the number of HARQ-ACK information bits is 2, 3, or 4, wherein the terminal generates the HARQ-ACK information bits for the second HARQ-ACK reporting mode, wherein, based on that the terminal is to multiplex the second multicast HARQ-ACK information according to the second HARQ-ACK reporting mode with the another uplink transmission in the selected one PUCCH resource, the terminal provides HARQ-ACK information to be multiplexed according to a first HARQ-ACK reporting mode, and wherein the HARQ-ACK information to be multiplexed that is provided according to the first HARQ-ACK reporting mode is distinguished from first multicast HARQ-ACK information according to the first HARQ-ACK reporting mode.

15. A base station comprising:

at least one transceiver; and at least one processor connected to the at least one transceiver, wherein the at least one processor is configured to:

transmit an indication of a second HARQ-ACK reporting mode, to at least one terminal through the at least one transceiver; and receive HARQ-ACK information multiplexed with another uplink transmission, from a terminal of the at least one terminal through the at least one transceiver, wherein, based on more than one HARQ-ACK information bit being reported by the terminal, one physical uplink control channel (PUCCH) resource based on values of the HARQ-ACK information bits is selected by the terminal from a set of PUCCH resources, wherein the number of HARQ-ACK information bits is 2, 3, or 4, wherein the HARQ-ACK information bits for the second HARQ-ACK reporting mode is generated by the terminal, wherein, based on that the second multicast HARQ-ACK information according to the second HARQ-ACK reporting mode is to be multiplexed with the another uplink transmission in the selected one PUCCH resource, HARQ-ACK information to be multiplexed is provided according to a first HARQ-ACK reporting mode, and wherein the HARQ-ACK information to be multiplexed that is provided according to the first HARQ-ACK reporting mode is distinguished from first multicast HARQ-ACK information according to the first HARQ-ACK reporting mode.

* * * * *